June 20, 1939.  I. D. GROAK ET AL  2,162,809
PURIFICATION OF WATER AND AIR IN AIR CONDITIONING
Filed June 20, 1935   2 Sheets-Sheet 1

Inventors:
Irwin D. Groak
and
Thos. Burton Orr

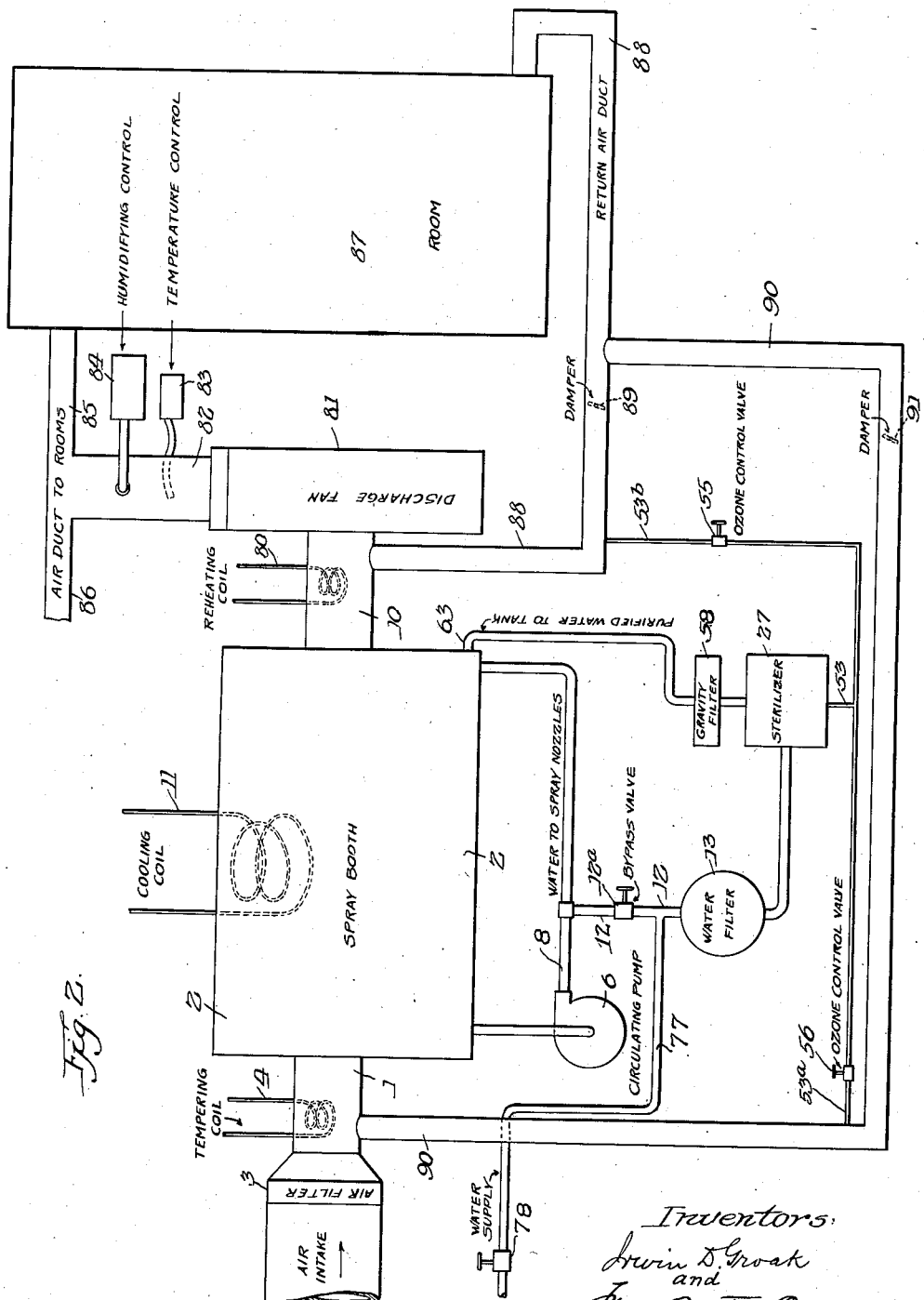

Patented June 20, 1939

2,162,809

UNITED STATES PATENT OFFICE 2,162,809

PURIFICATION OF WATER AND AIR IN AIR CONDITIONING

Irwin D. Groak and Fred Burton Orr, Chicago, Ill.

Application June 20, 1935, Serial No. 27,472

5 Claims. (Cl. 261—3)

The invention relates to improvements in air conditioning equipment, where air washer system is used, especially when the water is sprayed in a container, through which the air passes.

The main object of the invention is to provide a novel, practical, inexpensive, and economical method for continuously purifying the spray water, removing dust, sediment, odors, organic matter, and bacteria, keeping the water in the air washer clean and pure to continuously purify the air—thus improving the air conditioning system.

Another object of the invention is to use the same system and mechanism, which has been already installed, generally at a large initial expense, by by-passing the water from the circulating pump and being able to install a water purification and sterilizing attachment whereby a portion of the water is being recirculated. This not only prevents the water from becoming stagnant in the container, but eliminates the expense of labor and time to drain the tank and clean the dirt out of it, and refilling with fresh water after each cleansing.

Furthermore, it keeps the spray nozzles and the cooling coils free from slime and sediment. Therefore, they are more efficient in operation.

Air washing systems are sometimes installed in the basement of a building and in other cases even on the roof or pent-house.

With our invention, the purification system can be installed anywhere. All that is necessary is to lead the by-pass pipe from the pump to the purification system and back again to the tank. Should the distance be too great, it would only necessitate the installation of additional pump.

The equipment can be shipped with all parts made up and easily assembled anywhere, adapting it either to old or new installations.

With the foregoing and other objects in view, which will appear as the description proceeds, the invention consists of certain novel features of construction, arrangement, and combination of parts, hereinafter more fully described, illustrated in the accompanying drawings and particularly pointed out in the appended claims.

The equipment is so constructed that the amount of water to be circulated can be adjusted by the valves, and the sterilization method can be varied with the strength of sterilization and purification by adding more ozone generator tubes or taking some of them out of service.

Furthermore, the strength of the sterilizing residue can be varied by increasing or reducing the quantity of the activated carbon, quartz, and celite odor and taste removing gravity filter materials.

The ozone will attack all organic impurities because they contain carbon and the carbon with the ozone will form carbon dioxide and free oxygen. The activated carbon, which is mixed with celite and quartz sand in the gravity filter, absorbs the carbon dioxide gases and also the free chlorine and other gases that may be in the water from municipal treatment and from impurities of industrial waste in the main water supply, so that the water that is being returned from the purifier system into the spray booth is actually free from pathogenic bacteria, color, odor, and taste and is crystal pure ready to absorb the impurities carried in with the air and to further purify the air, which is the ultimate requisite of the entire system.

Some air washers have air filters installed on their intake side. Still no air filter removes highly volatile gases like sulphur or kitchen or alley odors. Neither will ordinary air washing accomplish this.

If it is impartical to install the ozone system for sterilization, our invention works just as well with silver compounds, ultra-violet ray and other methods of water purification.

We purify the water which cleans the air and make it possible to absorb gases and odors, and we remove such gases and odors also dirt and dust automatically and continuously in the same amount as they are brought in, thus assuring a clean healthy air in the air conditioning system, which afterwards can be cooled or heated and kept within controlled humidity and temperature.

It is understood that various changes in the form, proportion, size and minor details of the equipment may be made without departing from the spirit or sacrificing any of the advantages of the invention.

For the purpose of facilitating an understanding of our invention, we have illustrated in the accompanying drawings, preferred embodiments thereof, which when considered in connection with the following description, our invention, its mode of operation, assembly, and many of its advantages should be readily understood and appreciated.

Referring to the drawings in which similar characters of reference are employed to indicate corresponding or similar parts throughout the several figures:

Figure 2 is a diagrammatic plan view of a typical central air conditioning system showing the application of our invention as an integral part of the system.

Figure 1:
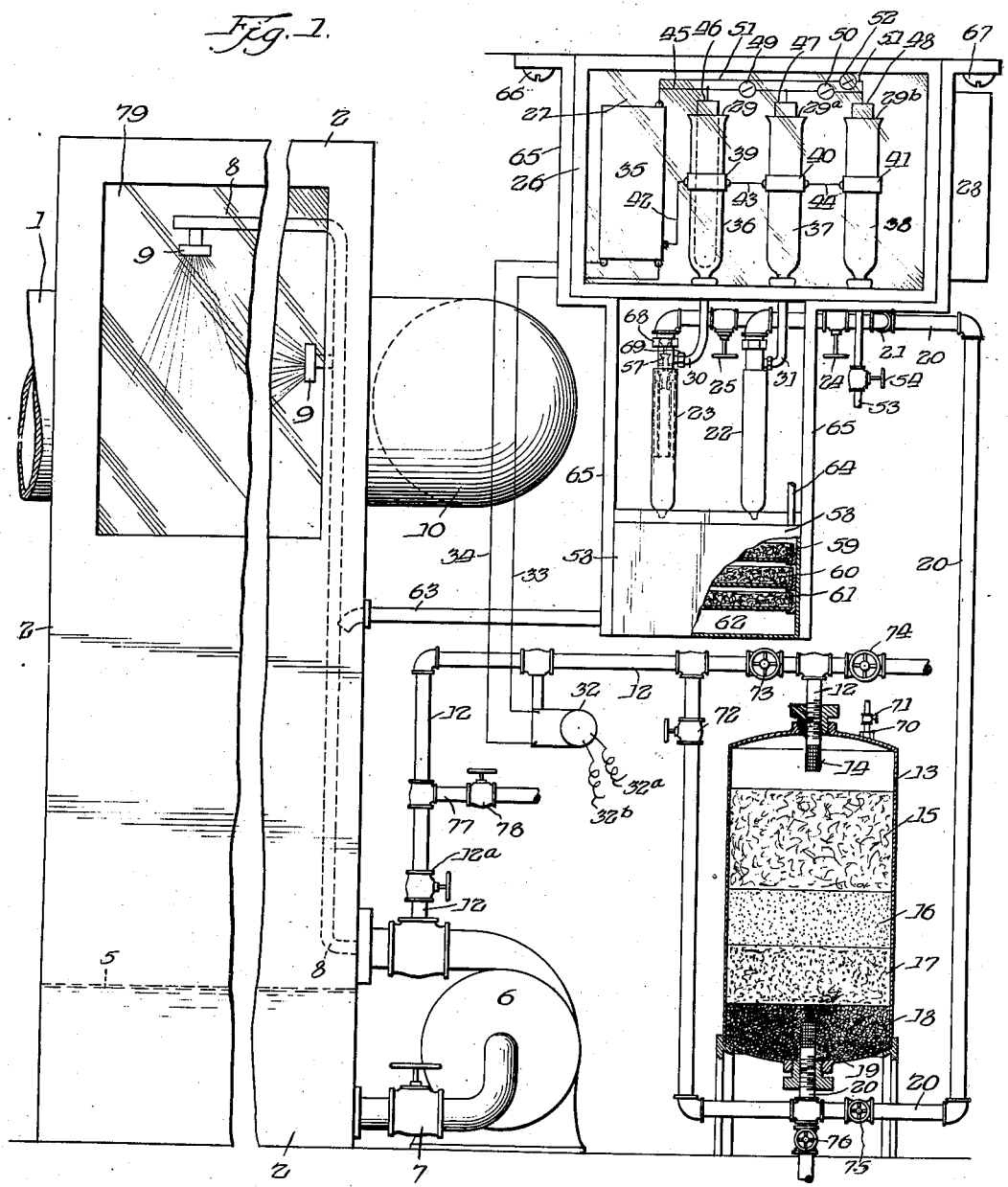
Figure 1 shows front elevation of the water purification system as connected to the spray booth.

The air intake pipe 1 is connected to spray booth 2. In complete system like shown in Figure 2, there are generally air filters 3 and tempering coil 4 before the spray booth. In many cases, however, the air comes in direct to the spray booth without prefiltration.

At the bottom of the spray booth 2 there is water 5 shown on Figure 1 and this water is circulated by a pressure pump 6, having a regulating valve 7, forcing the water in through pipe 8 to the spray nozzles 9 breaking up the water into fine mist, and after the air is washed by this water mist, the water drops down to the bottom of the spraying booth and the air travels to the outlet duct 10.

In a complete system there are cooling coils 11 in the spray booth as shown on Figure 2, but there are many installations and designs without the cooling coils. The cooling coils are sometimes placed in the room and at other times are entirely eliminated.

On the pressure pump 6, there is a by-pass pipe 12 with control valve 12a connected to water filter 13.

The water enters from pipe 12 through a screen 14 into the filter 13. This filter is filled with mixed activated carbon and celite 15, fine quartz 16, medium quartz 17 and gravel 18. At the bottom of the filter through screen 19 and pipe 20, the by-passed water travels to a T 21 from where the water is led to the ozone and water mixers 22 and 23. Number 22 can be operated with valve 24 and number 23 can be operated with valve 25. The ozone is generated in ozone generator case 26, having a glass in front of it 27, and air filter 28 for air intake. This air filter can be connected to the pressure side of the air ducts for air supply and the incoming air travels between the ozone generator concentric glasses 29, 29a and 29b, through pipes 30 and 31 into the ozone and water mixers. When the water starts to circulate by starting the circulating pump, the water will immediately work up a pressure in pipe 8 and pipe 12, turning on a pressure switch 32 operated from electric circuit wires 32a and 32b, which is connected through wires 33 and 34 to transformer 35, in the ozone generator box 26. This transformer raises the voltage from 110 or 220 or whatever is available to about 10,000 volts required, which is necessary to generate ozone in ozone generators 36, 37, and 38. Each ozone generator is mounted in clamps 39, 40 and 41 respectively with one of the secondary wires 42 from the transformer 35, connected to the clamp 39; but bar 43 is connected to clamp 40, and bus bar 44 is connected to clamp 41. The other secondary wire 45 is connected from transformer 35 to the inner tube 46 of ozone generator 36, also to the inner tube 47 of ozone generator 37, and the inner tube 48 of ozone generator 38 through switch 49, which can cut out ozone generators 37 and 38, and switch 50, which can cut out ozone generator 38.

By-pass bus bar 51 is also connected to ozone generator 38 with switch 52 for the reason that in case ozone generator 37 is required to be shut off, ozone generator 38 could be operated as desired. Ozone generator 38 has a separate outlet 53, which can be directly connected to air ducts, preferably to the return air ducts with controlling valve 54 as shown in Figure 1 and valves 55 and 56 as shown in Figure 2.

Ozone and water mixer pipes 23 and 22 have aspirators 57, and the mixture flows into tank 58 containing gravity filter trays 59, 60, and 61, which contain quartz, activated carbon, and celite.

The water is already sterilized when it leaves mixers 22 and 23, and by passing through the gravity filter trays 59, 60, and 61, where the odors and gases are absorbed and the water flows from the bottom 62 of the gravity filter tank through pipe 63 into spray booth 2, the system is completed.

We show three ozone generators in Figure 1 in the ozone generator box 27.

The simplest method for changing the strength of sterilization is by shutting off or starting more or less ozone generators through switches 49, 50, or 52. There are other known methods in the art of ozone generation like rheostats, which lower or raise the voltage within certain limits.

We also arranged for a vent 64 in gravity filter 58. For practical purposes, the ozone generator box is mounted in a frame 65 fastened to the ceiling by bolts 66 and 67 and the frame 65 holds also the gravity filter tank 58.

For the purpose of occasional cleaning, we have inserted union 68 on the ozone water mixers for the water and union 69 for the ozone pipe connection.

On the water filter 13, we have made provision by inserting pipe connection 70 and valve 71 should alum or any other chemical be required for water treatment. For example, where the spray water is alkaline, the addition of the right amount of alum will lower the pH value to 7, so that the water will become neutral and corrosion, which would otherwise tend to occur, is prevented. On the other hand, if the spray water should be slightly acidic, which is also detrimental, on account of the tendency to cause corrosion, the introduction of any suitable chemical, to increase the pH value to 7, is provided for by the pipe connection 70 and valve 71. In air conditioning systems it is very important to have a neutral spray water to prevent the occurrence of corrosion and other detrimental effects in the system. In most cases the filter works very well without the addition of chemical injection.

The filter 13 is equipped with five valves 72, 73, 74, 75 and 76. This is the standard backwash and rewash type and the operation is as follows:

For filtered water service valves 72, 74 and 76 are closed and valves 73 and 75 are open. In cleaning the filter, valves 73, 75, and 76 are closed and valves 72 and 74 are opened. The water comes through the bottom and the sediment is washed out and leaves valve 74 as waste into the sewer.

Before the filter is put back into operation, it is desirable to rewash by closing valves 74, 72 and 75 and opening 73 and 76. The water comes in through valve 73 and strainer 14 through filter 13 and goes to waste through valve 76. When the water is clean, close valves 76, 72, and 74 and open 73 and 75, after which the filter is again ready for use.

We provided on pipe 12, a connection 77 with valve 78 for main water supply to the spray booth to fill or add fresh water when needed. The spray booth is generally equipped with inspection glass sides 79.

The advantage of having a number of trays in the gravity filter 58 is that some of them can be removed or filtering material can be added to them, thus controlling the strength of the sterilizing residue.

Figure 2 shows in plan view a typical and complete central air conditioning system plant in a diagrammatical form. The air enters duct 1 through air filter 3 into the spray booth 2, where the air is continuously washed by spray water, which is recirculated through pump 6.

On the discharge side of the pump from pipe 8, there is a by-pass pipe 12 with regulating valve 12a connected to water filter 13, sterilizer 27, and gravity filter 58, leading the purified water through pipe 63 to the spray booth 2.

For filling the spray booth from the main water supply, also for adding fresh water when required, pipe 77 equipped with valve 78 is provided leading into pipe 12 between the by-pass valve 12a and water filter 13, so that the incoming water can be filtered and purified.

The air after being cleaned in the spray booth 2 leaves through duct 10, in which we show reheating coil 80, then through discharge fan 81 to duct 82, where temperature control 83 and humidifying control 84 are located; from duct 82, further ducts 85 and 86 are provided, leading the air to separate rooms.

We show one room 87 with a return air duct 88 connecting to air duct 10 and controlled by damper 89, also leading to air intake duct 1, through duct 90, controlled by damper 91, making it possible to use a part of the air over again. We made provision through pipes 53, 53a, and 53b from the sterilizer 27 to introduce ozone for reconditioning the returned air.

The ozone flow can be regulated by valves 55 and 56 in addition to the strength of the ozone that can be controlled in the ozone generators.

The amount of water to be by-passed for removing the impurities can be regulated by valve 12a, which controls the water flow to the filtering and purifying system, enabling the disposal of the obnoxious matters in the same proportion as the air brings them into the spray booth.

We claim:

1. An air treating system, including in combination with the means for moving a current of air through a spray chamber and with means for withdrawing water from a sump in the spray chamber and delivering the same back to the spray chamber in a continuous circulation, means for bypassing a portion of the water, said bypass comprising a filter for removing impurities from the water substantially at the same rate that they are taken out of the air by said spray of water, and means controlled by the flow of said bypassed water for introducing continuously a sterilizing agent to the water flowing in said bypass after filtering.

2. In an air treating system of that type in which the air is moved through a spray chamber and in which spray means in the chamber spray water into contact with the air, the combination of a pump for circulating the spray water from the spray chamber and back thereto, a conduit connected with the pump and carrying the spray water to the chamber, a bypass leading from the discharge of said pump back to a point in the circulation posterior to said spray means, and an ozone generator with a pressure controlled switch for controlling the operation of said ozone generator, said switch being controlled by the pressure of said pump.

3. Air conditioning equipment, including in combination with a spray chamber having spray means, a conduit for air extending through said spray chamber adjacent said spray means and from said spray chamber to the rooms to be air conditioned, a pump connected with said spray chamber, and said spray means for continuously circulating the water to and from said spray chamber, a bypass extending from the outlet of said pump, means in said bypass for filtering selective quantities of the water withdrawn through said bypass from the circulation, means in said bypass for selectively sterilizing the filtered water, means for returning the sterilized filtered water to the spray chamber, and means controlling the sterilization dependent upon the pressure in the bypass.

4. An air conditioning unit, including a spray chamber through which the air to be conditioned is conveyed, a pump for continuously circulating air wash water through said spray chamber and discharging said wash water to wash the air flowing through said chamber, a bypass extending from the outlet of said pump, a regulatable filter in communication with said bypass, means for selectively sterilizing the water having passed through the filter, means for returning the sterilized water to the spray chamber, and means dependent upon the pressure in the bypass for controlling the sterilization of the filtered water.

5. Air conditioning equipment including in combination with a spray chamber through which the air to be conditioned is conveyed, a pump for maintaining air wash water in circulation through said spray chamber, a bypass extending from the outlet of said pump, means in said bypass for filtering selectively determined quantities of water and for conveying selectively water through said filter for regeneration of the same, an ozone generator, a mixing chamber communicating with said ozone generator, a conduit extending from said filter to said mixing chamber, means within said mixing chamber for mixing the filtered water with the generated ozone, means connected with said mixing chamber for filtering said mixture, a conduit extending from said last named filter to the spray chamber, and means controlled by the pressure of the water flowing through the bypass for controlling the operation of the ozone generator.

IRWIN D. GROAK.
FRED BURTON ORR.